May 3, 1932.  F. JOHNSON ET AL  1,856,189
CLUTCH LUBRICATING MEANS
Filed April 17, 1931    2 Sheets-Sheet 1
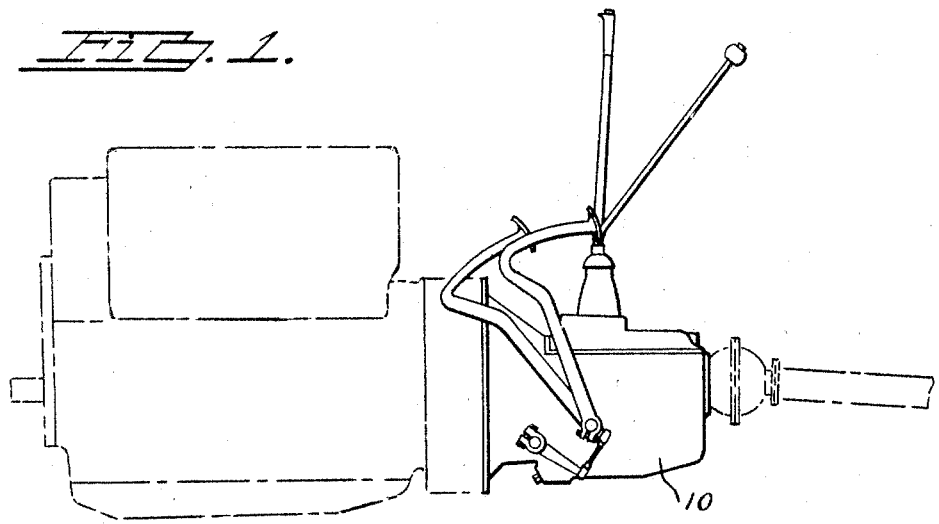
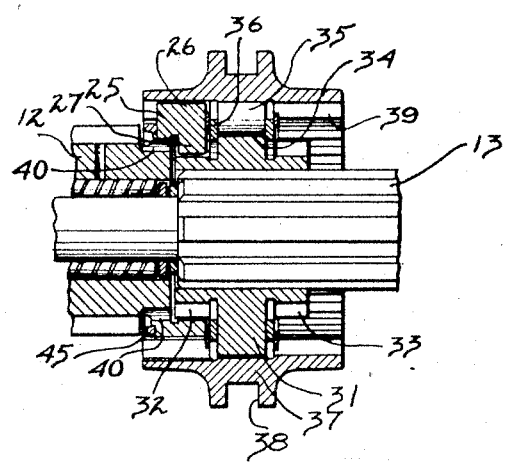
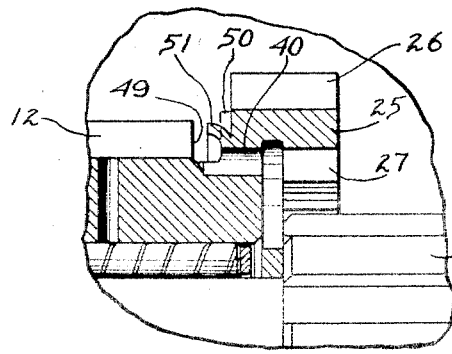
INVENTOR.
Frank Johnson.
BY E. G. Schubert.
ATTORNEY.

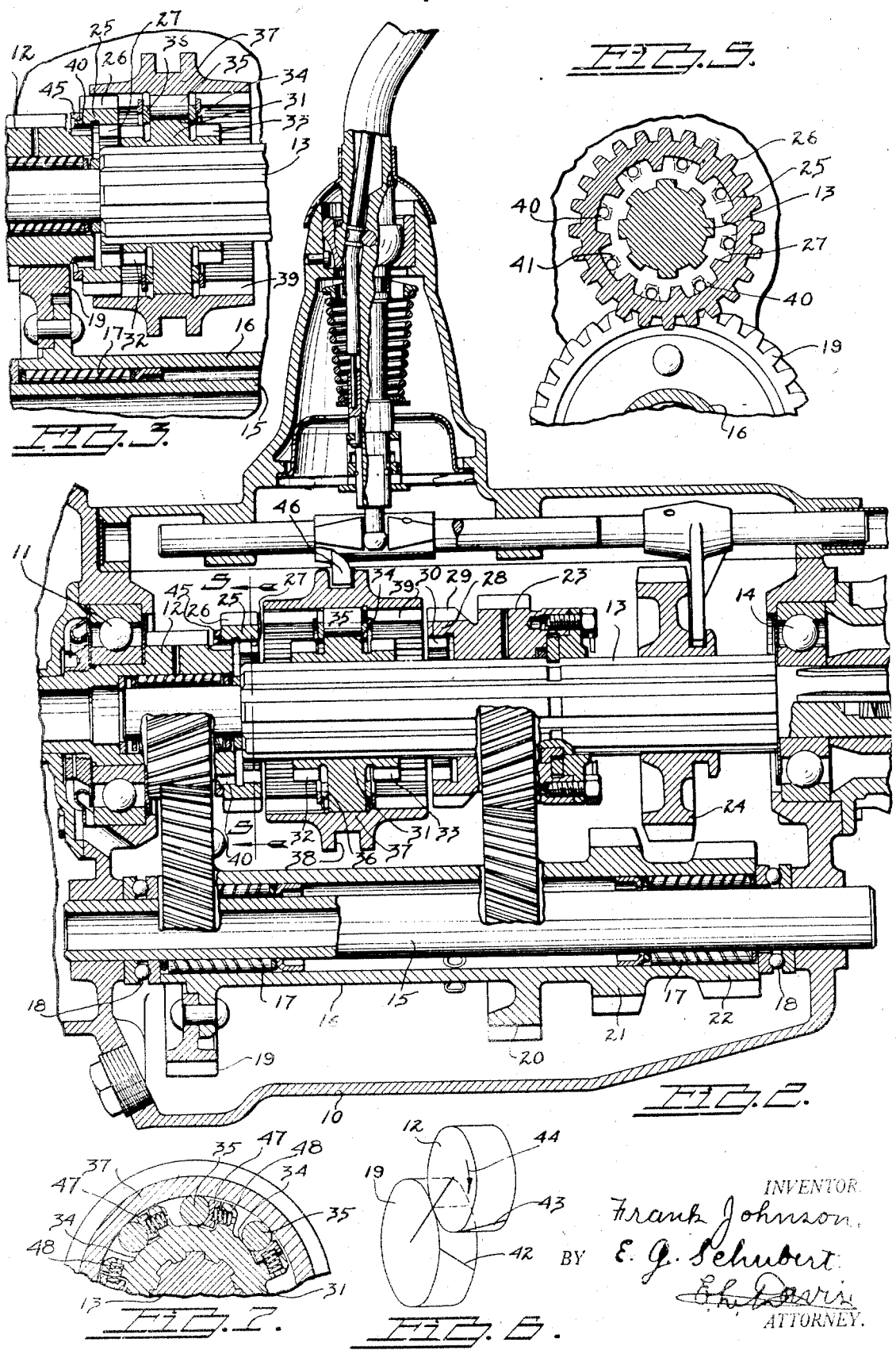

Patented May 3, 1932

1,856,189

UNITED STATES PATENT OFFICE

FRANK JOHNSON AND ELMER GOULD SCHUBERT, OF DETROIT, MICHIGAN, ASSIGNORS TO FORD MOTOR COMPANY, OF DEARBORN, MICHIGAN, A CORPORATION OF DELAWARE

CLUTCH LUBRICATING MEANS

Application filed April 17, 1931. Serial No. 530,906.

The object of our invention is to provide a transmission having a novel means whereby the operative parts of the transmission are lubricated.

Still a further object of our invention is to provide a transmission of the free-wheeling type in which an overrunning clutch is provided between the engine and the drive shaft in several of the transmission speeds, which overrunning clutch will be lubricated in an improved manner by the action of the transmission gearing.

More particularly, our invention consists in providing helical gear teeth on one pair of transmission gears, the spiral of which teeth act to force lubricant in an axial direction. An annulus of oil conduits is provided in an adjacent gear whereby oil will be conducted through these conduits to the overrunning clutch mechanism, thereby amply lubricating same.

With these and other objects in view our invention consists in the arrangement, construction and combination of the various parts of our improved device, as described in this specification, claimed in our claims and illustrated in the accompanying drawings, in which:

Figure 1 shows a side elevation of our improved transmission.

Figure 2 shows a vertical central sectional view though the transmission, shown in Figure 1, the overrunning clutch being shown disengaged.

Figure 3 shows a sectional view through the overrunning clutch, when shifted to one of its operative or free-wheeling positions.

Figure 4 shows a sectional view through the overrunning clutch, when shifted still further to its locked or positive drive position.

Figure 5 shows a sectional view taken on the lines 5—5 of Figure 2.

Figure 6 shows a diagrammatic view illustrating the oil throwing action of our transmission gears.

Figure 7 shows a transverse sectional view through our improved overrunning clutch, and Figure 8 shows an enlarged view of an alternate driving gear construction, illustrating the manner of conducting oil to our oil conduits therein.

Referring to the accompanying drawings, we have used the reference numeral 10 to indicate generally a transmission housing, such as is commonly associated with an automobile. Rotatably mounted within the forward end of this housing, by means of a ball bearing 11, we have provided a clutch driving sleeve and gear 12 which is in driving connection with the engine clutch and which is provided with an annular bore therein in which the forward end of a splined driven shaft 13 is rotatably mounted, the rear end of the shaft being rotatably mounted in the housing 10 by means of a second ball bearing 14. A jack shaft 15 is secured in the lower part of the housing in position parallel to the shaft 13 and a cluster gear member 16 is rotatably mounted on this shaft by means of a pair of spaced roller bearings 17. Suitable ball thrust bearings 18 are inserted between the ends of the cluster gear member and the housing which absorb the end thrust impressed on the cluster gear member, which end thrust cause will later be described.

The cluster gear member 16 has a spiral toothed driving gear 19 fixedly fastened to its foremost end in constant mesh with the clutch gear 12. It will be noted that both gears, 12 and 19, are helical gears so that an exceptionally quiet drive is obtained therethrough. Spaced rearwardly at successive intervals from the gear 19 we have provided, first an intermediate speed gear 20, then a low speed gear 21, and then a reverse speed gear 22, these three last mentioned gears being formed integrally with the cluster gear member. In order to effect the intermediate speed drive a gear 23 is rotatably mounted upon the shaft 13 in constant mesh with the gear 20 so that when the clutch gear 12 is rotated, the gears 19, 20 and 23 will be positively driven thereby at all times. However, the gear 23 being rotatably mounted upon the splines of the shaft 13, must be otherwise clutched to the shaft to effect the intermediate speed drive.

A reverse and low speed sliding gear 24 is reciprocally splined to the rear portion of the shaft 13 in position to be selectively meshed with the gear 21 and with a suitable reverse idler gear, not shown in the drawings, which latter gear is in constant mesh with the reverse gear 22. Inasmuch as the reverse and low speed gear ratios are accomplished in the conventional manner further description of these members is deemed unnecessary.

The means whereby the direct and second speed ratios are obtained in this transmission is believed to be of novel construction and consists of a clutching device whereby the splined shaft 13 may be selectively coupled, either directly or through an overrunning clutch, with either the gear 23 or the clutch gear 12. Still further, the means whereby this device and overrunning clutch are lubricated constitutes still another novel feature which is the subject of claims herein.

The rear end of the gear 12 is formed integrally with a sleeve 25. An annulus of outwardly extending clutch teeth 26 are machined on the rearmost end of this sleeve and a second annulus of internal clutch teeth 27 are also machined therein aligned with the teeth 26. Projecting forwardly from the gear member 23 is provided a similar sleeve 28 in which an external annulus of clutch teeth 29 and an internal annulus of clutch teeth 30 are machined. Slidably mounted on the spline shaft 13 between the sleeves 25 and 28 and splined thereto we have provided a driving member 31 which is formed integrally with a plurality of external clutch teeth 32 projecting forwardly therefrom and a similar annulus of external clutch teeth 33 projecting rearwardly therefrom. When the driving member 31 is moved to its extreme forward position the external teeth 32 mesh with the internal teeth 27, and inversely, when the driving member is moved to its extreme rear position the external teeth 33 mesh with the internal teeth 30. However, the driving member is permitted a considerable lengthwise movement on the shaft 13 before either of the above mentioned clutching actions occur. The purpose of this free movement is so that an overrunning clutch may be engaged to operatively connect the driving member with either of the gears 12 or 23 prior to the engaging of the positive clutch members.

The intermediate peripheral portion of the driving member 31 is machined with a plurality of inclined faces 34 thereon and a plurality of rollers 35, are mounted one on each of these inclined faces. The rollers 35 are urged against the bore of a sleeve 37 by means of shoes 47 and coil springs 48, whereby rotation of the sleeve 37 in one direction will actuate the driving member 31 through the rollers, while rotation of the sleeve in the opposite direction will overrun the driving member. The sleeve 37 is provided with a roller retainer 36 which engages the center portion of the driving member 31 so that reciprocation of the sleeve reciprocates the retainer, the rollers 35, and the driving member 31 as a unit. An annular peripheral groove 38 is machined in the central portion of the sleeve 37 into which groove a suitable shifter fork 46 projects so that the unit may be operatively reciprocated by the gear shifting mechanism of the transmission.

It will be noted from the drawings that the sleeve 37 projects a considerable distance beyond either end of the driving member 31. The interior of this sleeve on each side of the center overrunning clutch portion is splined, as at 39, these splines co-acting with the clutch teeth 26 and 29, respectively. The sleeve 37 is of such a length that when in the neutral position, as shown in the Figure 2, none of the clutch teeth will be engaged. However, when the sleeve 37 is shifted to the position, as shown in Figure 3, then the spline 39 on the forward end of the sleeve will engage the external teeth 26 to thereby connect the clutch gear 12 with the sleeve 37. The gear 12 then rotates the driving member 31 through the clutch rollers 35 to thereby drive the splined shaft 13 to propel the car. This drive is, of course, an overrunning drive so that the car is free to coast or overrun the engine. This condition is known as free-wheeling.

When its desired to positively connect, for rotation in both directions, the shaft 13 with the gear 12 the sleeve 37 is shifted forwardly still further, as shown in Figure 4, to thereby engage the external teeth 32 of the driving member with the internal teeth 27, thereby positively locking the driving member to the gear 12. Thus, a drive in both directions is obtained from the gear 12 to the driving member 31.

The intermediate speed drive is obtained in a like manner, that is, the overrunning drive is engaged by shifting the sleeve 37 rearwardly so that the rear splines 39 engage the external clutch teeth 29. When a positive drive is desired in this speed the sleeve is shifted rearwardly still further or until the teeth 33 engage the internal teeth 30. This intermediate positive drive is especially useful when descending steep hills as the friction of the engine may then be used as a brake to check the speed of the car.

Inasmuch as the overrunning drive in direct speed is in almost constant use when the car is in operation, the positive drive being used only when the car is descending hills, it will readily be seen that the overrunning clutch device must be amply lubricated in order to withstand such constant service. Referring to Figure 2, we have shown means whereby this clutch device is lubricated. The direction of rotation of the driving gear 12, looking from the front of the transmission, is in a clockwise direction and we have provided helical gear teeth for this gear which teeth are machined with a left hand spiral and which mesh with right hand helical teeth machined in the gear 19. These helical teeth perform two functions, that is, they provide an exceptional quiet transmission in both the direct drive and in the reduced speed ratios, and further, the peculiar action of these teeth lubricates the overrunning clutch mechanism. For the purpose of providing a quiet drive spiral teeth of either hand are equally effective but for the purpose of lubricating the overrunning clutch the angle of the driving gear must be a left hand spiral, as heretofore stated.

The sleeve member 25 is provided with an annulus of openings 40 in substantial alignment with the spaces between the teeth on the gear 12. Further, these openings 40 may be said to be aligned with the space occupied by each alternate internal clutch tooth 27, these alternate teeth being removed, so that each opening 40 is actually aligned with the central portion of a space between the remaining clutch teeth 27. In the manufacture of the device these spacers are provided when the teeth 27 are formed so that a separate operation is not necessary to remove the alternate teeth, which would otherwise be aligned with the openings 40. Inasmuch as there are twice as many teeth 32, formed on the driving member as internal teeth 27, they interlock when engaged, as shown by dotted lines 41 in Figure 5. It will be apparent from this view that each alternate space between the clutch teeth 32 is aligned with one of the openings 40, so that a plurality of conduits are formed by these alternate spaces which extend between the teeth on the gear 12 to the overrunning clutch mechanism.

In the manufacture of the gear 12 an annular groove 49 is provided between the teeth thereon and the sleeve 25 so that the tooth cutter may have clearance at the end of its stroke. Such a groove would interfere with the operation of our oiling system for the reason that a large portion of the oil would be thrown out of this groove instead of being forced through the conduits 40. We have therefore provided a ring 45 which is preferably formed from spring steel and which is snapped into the groove in the sleeve 25 after the gear 12 is machined. This ring serves to deflect oil from between the teeth of the gear 12 into the openings 40. An alternate construction which may be used if desired in the forming of the gear 12 is shown at Figure 8, where the original groove 49 is defined by the dotted lines 50. After the teeth on the gear 12 are machined the adjacent end of the sleeve 25 is spun over, as shown at 51, to form the deflecting ring and thus deflect oil from between the gear teeth to the conduits 40.

The lubricating action of the gears 12 and 19 is diagrammatically shown in Figure 6 wherein one of the teeth on the gear 19 is illustrated by the line 42, while the space between two of the teeth on the gear 12 into which the first mentioned tooth enters, is shown by line 43. It will readily be seen that when the gears are rotating in the normal direction, as shown by arrow 44, the left hand or forward portion of the tooth 42 engages the respective portion of the groove 43 as the teeth come into mesh. As the space between the gear teeth carry a considerable quantity of oil therein and as the line of contact for each respective tooth shifts towards the right across the gear as the gears rotate this quantity of oil will be forced toward the right as the tooth rolls into and out of mesh. This action occurs during only a fraction of a revolution of the gears so that the oil is in effect squirted out from the right hand side of the gears. The openings 40 being aligned with the spaces between the teeth 12 receive the oil which then flows between the clutch teeth 27 and into the space between the sleeve 25 and the overrunning clutch mechanism. The overrunning clutch is thereby flooded with oil when the overrunning clutch unit is in a forward position.

Among the many advantages arising from the use of our improved device, it may be well to mention that we have provided a transmission wherein the speed reducing gear in intermediate speed is exceptionally quiet. Still further, this gearing provides a novel means for lubricating a free-wheeling mechanism which would otherwise require a costly and elaborate oiling system. Still further, by the unique construction of our overrunning clutch, we are enabled to selectively provide a positive and an overrunning drive in both the direct and intermediate speeds with a relatively small number of parts to thereby lessen the cost of such structure.

Some changes may be made in the arrangement, construction and combination of tne various parts of our improved device without departing from the spirit of our invention, and it is our intention to cover by our claims, such changes as may reasonably be included within the scope thereof.

We claim as our invention:—

1. In a transmission, a pair of helical gears in mesh with each other, a clutch member extending axially from one of said gears, an overrunning clutch unit rotatably mounted in position aligned with said clutch member, and a plurality of conduits extending through said clutch member aligned with the teeth on said adjacent gear, whereby rotation of said helical gears will force lubricant axially through said openings into contact with the overrunning clutch mechanism.

2. In a transmission, a pair of meshing helical gears, a clutch member formed integrally with one of said gears and extending axially therefrom, an overrunning clutch rotatably mounted in position aligned with said clutch member, and a plurality of conduits extending through said clutch member aligned with the teeth on said integral gear, whereby rotation of said helical gears will force lubricant axially through said openings into contact with the overrunning clutch mechanism.

3. In a transmission, a pair of meshing helical gears, a clutch member extending rearwardly from one of said gears, said clutch member being axially spaced from the ends of the adjacent gear teeth, a ring secured to said clutch member so as to form an annular chamber between said clutch and gear and gear teeth, an overrunning clutch rotatably mounted in position and aligned with said clutch member, and a plurality of conduits extending from said annular chamber through said clutch member, whereby rotation of said helical gears will force lubricant from between the gear teeth through said chamber and conduits and into contact with the overrunning clutch mechanism.

4. In a transmission, a driving helical gear in driving connection with the vehicle engine, a driven helical gear in mesh with said driving gear, a clutch secured to and extending axially from said driving gear, an overrunning clutch rotatably mounted in position aligned with said driving gear, and a plurality of conduits extending through said clutch member aligned with the spaces between the teeth on said driving gear, whereby rotation of said gears will force lubricant axially through said conduits and into contact with the overrunning clutch mechanism.

5. In a transmission, a driving helical gear rotated by the vehicle engine, a driven helical gear in mesh with said driving gear, a clutch member formed integrally with and extending axially from said driving gear, an overrunning clutch rotatably mounted in position aligned with said driving gear, and a plurality of conduits extending through said clutch member aligned with the teeth on said driving gear, whereby rotation of said gears will force lubricant axially through said conduits and into contact with the overrunning clutch mechanism.

6. In a transmission having a housing, a driving helical gear rotatably mounted in the forward end of said housing, a driven helical gear rotatably mounted and in mesh with the driving gear, a splined shaft aligned with said driving gear having its forward end rotatably mounted therein, an overrunning clutch slidably mounted on said shaft, a clutch member extending from the end of said driving gear in position between said overrunning clutch and the teeth on the driving gear, and a plurality of conduits extending through said clutch member and aligned with the teeth on said driving gear, whereby rotation of the gear teeth will force lubricant from between the gear teeth axially through said conduits and into contact with the overrunning clutch mechanism.

FRANK JOHNSON.
ELMER G. SCHUBERT.